United States Patent [19]

Buchanan et al.

[11] 4,303,447

[45] Dec. 1, 1981

[54] LOW TEMPERATURE DENSIFICATION OF ZIRCONIA CERAMICS

[75] Inventors: Relva C. Buchanan; H. Dale DeFord, both of Champaign; Anup Sircar, Urbana, all of Ill.

[73] Assignee: University of Illinois Foundation, Urbana, Ill.

[21] Appl. No.: 136,742

[22] Filed: Apr. 2, 1980

[51] Int. Cl.³ .............................................. C04B 35/48
[52] U.S. Cl. ...................................... 501/103; 264/65; 501/104; 501/105; 501/152
[58] Field of Search ................... 106/57; 423/266, 275, 423/608; 264/65

[56] References Cited

U.S. PATENT DOCUMENTS

| | | | |
|---|---|---|---|
| 2,875,086 | 2/1959 | Weyl | 106/57 |
| 3,011,901 | 12/1961 | Traub et al. | 106/57 |
| 3,385,915 | 5/1968 | Hamling | 106/57 |
| 3,410,728 | 11/1968 | Fullman et al. | 106/57 |
| 3,862,283 | 1/1975 | Rhodes | 106/57 |

*Primary Examiner*—O. R. Vertiz
*Assistant Examiner*—Mark Bell
*Attorney, Agent, or Firm*—Mathew L. Kalinowski

[57] ABSTRACT

Addition of from about 1.0 to about 15% by weight of a vanadium oxide or boric oxide promoter to a zirconia ($ZrO_2$) powder promotes rapid densification at temperatures below about 1300° C. For example, a density of greater than 92% of estimated theoretical density can be achieved by addition of 4% by weight of $ZrV_2O_7$ to monoclinic $ZrO_2$ and sintering at 1100° C. for about 24 hours. Sintering at temperatures below about 1150° C. avoids the destructive monoclinic/tetragonal phase transformation and provides for better control of microstructure and composition. A density of greater than 98% of estimated theoretical density can be achieved by addition of from about 2 to about 5% by weight of a boric oxide promoter to stabilized cubic $ZrO_2$ and sintering at about 1200° C. for about 4 hours.

11 Claims, 4 Drawing Figures

LOW TEMPERATURE DENSIFICATION OF ZIRCONIA CERAMICS

This invention was made in the course of work supported by a grant from the Office of Naval Research, Department of the Navy.

This invention relates to densified zirconia ($ZrO_2$) ceramic compositions and to processes for densifying such compositions. In one aspect, this invention involves the low temperature densification of monoclinic, unstabilized $ZrO_2$ with the aid of a vanadium oxide promoter. In another aspect, this invention involves the low temperature densification of cubic, stabilized $ZrO_2$ with the aid of a boric oxide promoter.

Densified $ZrO_2$ ceramic compositions are well known and widely used as refractory materials for high temperature furnace applications. In addition, because of the high ionic conduction of the oxide, $ZrO_2$ ceramics are being used increasingly in electronic applications, for example as solid electrolyte for fuel cell and oxygen sensor applications. Densification of the oxide is conventionally carried out at temperatures from about 1700° to about 1900° C. However, at temperatures of about 1150° C., unstabilized $ZrO_2$ undergoes a monoclinic/tetragonal phase transformation with a destructive volume contraction of about 9%. To prevent this destructive phase transformation, the $ZrO_2$ can be stabilized by addition of up to about 15 mol % of calcium oxide, magnesium oxide, or yttrium oxide. In addition to functioning as stabilizers, the added oxides increase oxygen ion mobility and therefore the conductivity of the $ZrO_2$ composition. But with the high densification temperatures conventionally required, it is difficult to obtain precise control of the microstructure and impurity levels in the final composition to the extent necessary for electrolytic applications.

Accordingly, it is an object of this invention to densify monoclinic, unstabilized $ZrO_2$ to a density greater than about 90% of theoretical density at a temperature below about 1150° C., thereby avoiding the monoclinic/tetragonal phase transformation.

Another object of this invention is to densify cubic, stabilized $ZrO_2$ to a density of greater than about 98% of theoretical density at a temperature of about 1200° C.

Still another object is to provide improved control of composition and microstructure of the $ZrO_2$ ceramic composition.

A further object is to provide economies in the processing of $ZrO_2$ ceramics by virtue of lower firing temperatures.

These and other objects will become apparent as description of the invention proceeds.

It has now been found that low temperature densification of $ZrO_2$ can be effected by liquid phase sintering with from about 1.0 to about 15% by weight of a low melting vanadium oxide or boric oxide densification promoter. Suitable promoters are the oxides of vanadium and boron that melt below about 1200° C., preferably those oxides that melt congruently to provide low viscosity liquids above their melting points. Particularly effective vanadium oxide promoters are $ZrV_2O_7$ (m.p. 790° C.) and $V_2O_5$ (m.p. 690° C.). Particularly effective boric oxide promoters are calcium metaborate ($CaO \cdot B_2O_3$, m.p. 1156° C.), calciumtetraborate ($CaO \cdot 2B_2O_3$, m.p. 986° C.), and $B_2O_3$ (m.p. 460° C.).

Addition of from about 1 to about 10%, preferably from about 2 to about 5%, by weight of an oxide of vanadium to a $ZrO_2$ powder having a monoclinic crystal configuration promotes rapid densification at temperatures below about 1150° C. Sintering is suitably carried out for up to about 24 hours and densities of greater than 90% of theoretical are readily obtained. Sintering below 1150° C. avoids the monoclinic/tetragonal phase transformation and eliminates the need for use of stabilizers such as CaO, MgO, and $Y_2O_3$. The absence of added stabilizers results in better control of impurity levels in the densified $ZrO_2$ ceramic composition.

Addition of from about 1 to about 15%, preferably from about 2 to about 10%, by weight of an oxide of boron to a $ZrO_2$ powder stabilized in the cubic crystal configuration provides rapid densification at temperatures below about 1350° C. Densities of greater than 98% of theoretical are obtained by sintering at 1200° C. for up to about 4 hours. The $ZrO_2$ powder can be stabilized in the manner well known in the art, for example by addition of from about 1 to about 15% by weight of CaO or $Y_2O_3$. Commercially available $ZrO_2$ powders, stabilized with 6.5% by weight of CaO or with 12% by weight of $Y_2O_3$, can be employed advantageously in the practice of this invention. Sintering under the above-prescribed conditions results in partial destabilization of cubic to monoclinic $ZrO_2$. Destabilization to provide up to about 30% by weight of the monoclinic crystal configuration is desirable in that it induces a large volume of microcracks in the ceramic which enhances thermal shock resistance, (Garvie, R. C., et al., J. Am. Ceram. Soc. 55(3) 152-157, 1972). Use of the boric oxide promoters of this invention permits precise control of the amount of monoclinic $ZrO_2$ formed, and thus the fracture toughness and thermal shock resistance of the fired ceramic.

The $ZrO_2$ powders that can be used in this invention are readily available and typically show the properties listed in the following table.

TABLE I

| | Zirconia($ZrO_2$) Powders. | |
| --- | --- | --- |
| | Monoclinic $ZrO_2$ | Stabilized Cubic $ZrO_2$ |
| M.p., °C. | 2680 | 2625 |
| Particle size | −325 mesh ave. 1.5 micron | −325 mesh ave. 1.5 micron |
| Theoretical density, g/cc | 5.56-5.68 | 5.56-6.05 |
| $ZrO_2$(min) | 99% | 93.5% |
| $SiO_2$ | 0.18 | 0.62 |
| CaO | 0.22 | 4.80 |
| MgO | 0.15 | 0.25 |
| $Fe_2O_3$ | 0.10 | 0.10 |
| $Al_2O_3$ | 0.16 | 0.18 |
| $TiO_2$ | 0.11 | 0.11 |

The vanadium oxide and boric oxide densification promoters are preferably of reagent grade purity, and can be employed in the form of oxides having the formula $V_2O_5$ and $B_2O_3$; derivatives that afford such oxides during firing can also be used. A particularly useful vanadium oxide derivative has the formula $ZrV_2O_7$ and can be prepared by the procedure of Peyronel, Gazz. Chim. Ital., 72 77-83 (1942), which procedure involves precipitation from a solution containing equimolar amounts of $ZrO_2$ and $V_2O_5$ in the form of $ZrO(NO3)_2$ and $NH_4VO_3$, followed by calcination at 330° C. to drive off ammonium salts. Particularly useful boric oxide derivatives are calcium metaborate ($CaO \cdot B_2O_3$), and calcium tetraborate ($CaO \cdot 2B_2O_3$).

In the densification process, the $ZrO_2$ powder and the added promoter are milled and blended, formed and pressed at about 5000 to about 40,000 psi, and then fired in air. In the case of monoclinic $ZrO_2$ with a vanadium oxide promoter, the mixture is fired at a temperature of from about 1050° to about 1150° C. for from about 0.5 to about 24 hours to provide densification of greater than about 90% of theoretical value. In the case of stabilized, cubic $ZrO_2$ with a boric oxide promoter, the mixture is fired at a temperature of from about 1150° to about 1350° C. for from about 0.5 to about 4 hours to provide densification greater than about 98% of theoretical value.

DESCRIPTION OF THE PREFERRED EMBODIMENTS

The invention is further illustrated by reference to the following procedures and examples.

Various samples were prepared from mixtures of monoclinic $ZrO_2$ and vanadium oxide promoters. Amounts of from 1.0 to 10% by weight were used in the case of $ZrV_2O_7$ promoter. Amounts of from 0.25 and 6.5% by weight were used in the case of $V_2O_5$ promoter. The samples, 50 to 100 g in size, were weighed blended and milled in plastic jars containing dense zirconia balls. The procedure followed was to wet mill for 2-5 hours in isopropanol, vacuum dry, and then dry mill for an additional 2 hours. A dilute polyvinyl alcohol solution was used as a binder to aid in pressing. The samples were granulated and passed through a 35-mesh screen prior to pressing.

Sample discs about 1.6 cm in diameter and about 0.3 cm thick were prepared by pressing in a hydraulic press at about 25,000 psi. The samples were then placed on platinum sheets and fired at temperatures of from about 1050° to about 1125° C. for from about 0.5 to about 4 hours.

Figure 1:
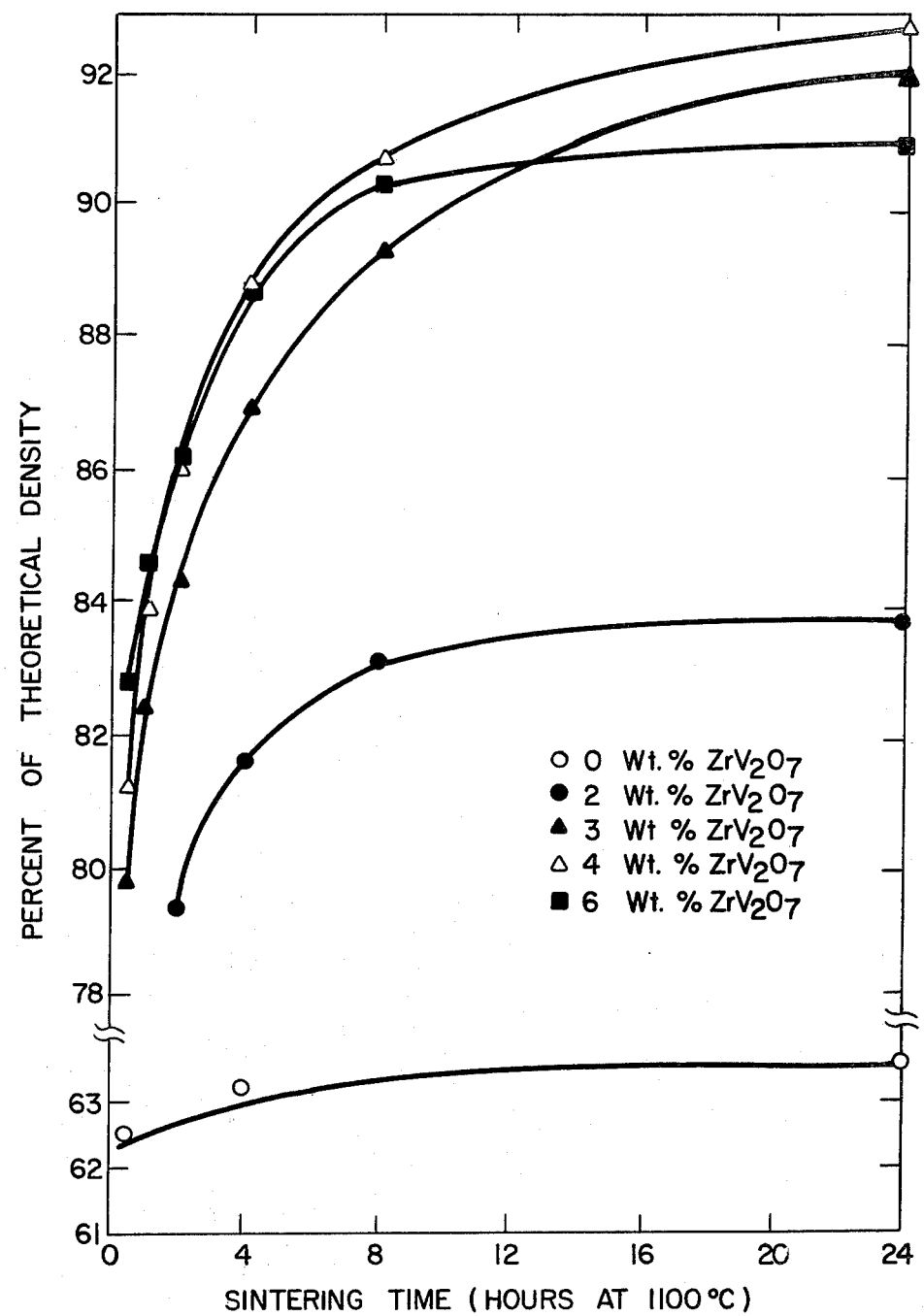
FIG. 1 illustrates the percent of theoretical density obtained as a function of sintering time for monoclinic $ZrO_2$ powders promoted with various amounts of $ZrV_2O_7$.
Figure 2:
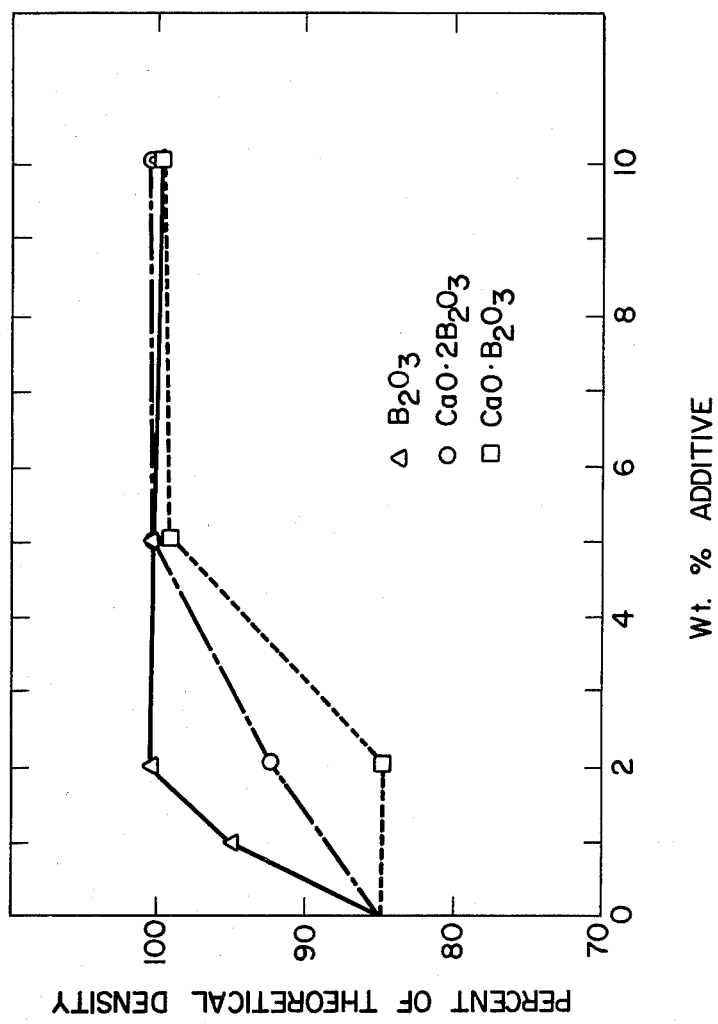
FIG. 2 illustrates the percent of theoretical density obtained as a function of the addition of various amounts of boric oxide promoters for a CaO-stabilized, cubic $ZrO_2$ powder fired at 1200° C. for 4 hours.

Bulk density measurements were made on the fired samples with a mercury hydrometer. The densification data are plotted in FIG. 1 to show the percent of theoretical density obtained with increasing sintering time for monoclinic $ZrO_2$ powders promoted with various amounts of $ZrV_2O_7$. It is seen that at 1100° C. use of 2 to 6% by weight of $ZrV_2O_7$ provided a high degree of densification with sintering times of 4 to 24 hours. Greater than 92% of theoretical density was obtained with 3 to 4% by weight of $ZrV_2O_7$ and a sintering time of 24 hours. Essentially equivalent results were obtained with added $V_2O_5$ promoter. In contrast, a control composition containing no added promoter showed essentially no densification under these conditions.

Two stabilized, cubic $ZrO_2$ powders were used in the following examples: one stabilized with 6.5% by weight of CaO, the other stabilized with 12% by weight of $Y_2O_3$. The boric oxide promoters used were reagent grade $B_2O_3$, calcium metaborate, and calcium tetraborate, the last two made by melting appropriate amounts of $CaCO_3$ and $B_2O_3$, followed by crushing and milling in methanol. The promoters were added in amounts of 2, 5, and 10% by weight. Samples of $ZrO_2$ powder and promoter weighing 15 g were blended and milled in plastic bottles using zirconia grinding balls and methanol as dispersant. After milling for 4 to 5 hours, the powders were vacuum dried. A dilute methanol solution of carbowax was used as a binder to aid in pressing.

Sample discs about 1.25 cm in diameter and about 0.2 cm thick were made by pressing in a hydraulic press at 22,000 psi. The samples were placed on platinum sheets and fired at 1200° C. for 4 hours and at 1350° C. for 4 hours.

Bulk density measurements on the fired samples were made with a mercury hydrometer. Table II shows the bulk and theoretical densities for CaO-stabilized $ZrO_2$ samples promoted with various amounts of calcium metaborate, calcium tetraborate, and $B_2O_3$. It is seen that with no promoter, the fired densities at 1200° and 1350° C. were 85% and 95% of theoretical density. With 2% calcium metaborate addition, there was no change in densification at 1200° C., and a decrease at 1350° C. This decrease probably reflects the fact that insufficient liquid was present to aid densification by particle rearrangement but was probably sufficient to cause relaxation or expansion of the highly compressed disc. With 5% calcium metaborate addition, densification was 99% and 100% of theoretical at 1200° and 1350° C. With 10% calcium metaborate addition, essentially complete densification was also obtained.

With calcium tetraborate, increased densification was obtained with 2% addition and complete densification with 5% addition. With 10% addition, there was some decrease in densification because of excess of liquid phase and some puddling was also observed.

With $B_2O_3$ promoter densification reached a maximum for 2% addition at 1200° C. This can be attributed to the fact that $B_2O_3$ combines with the CaO stabilizer to form a low melting calcium borate that is liquid above 1100° C. Even with 1% $B_2O_3$ addition enough liquid was formed to provide significant densification at 1200° C.

Table III shows bulk and theoretical densities for $Y_2O_3$-stabilized $ZrO_2$ samples promoted with various amounts of calcium metaborate, calcium tetraborate, and $B_2O_3$. It is seen that $Y_2O_3$-stabilized $ZrO_2$ is far less responsive than is CaO-stabilized $ZrO_2$ to boric oxide promoters. Additions at the 10% level were needed to obtain full densities at 1200° C. The least active promoter was $B_2O_3$ which, in contrast, was the most reactive promoter with CaO-stabilized $ZrO_2$.

TABLE II

Fired Densities for CaO-Stabilized ZrO₂ Compositions

| Composition | Theoretical Density, % | Fired Densities 1200° C. Bulk Density | Fired Densities 1200° C. Theoretical Density, % | Fired Densities 1350° C. Bulk Density | Fired Densities 1350° C. Theoretical Density, % |
|---|---|---|---|---|---|
| CaO-Stabilized ZrO₂ | 5.5 | 4.6 | 85 | 5.2 | 95 |
| +2 wt% Ca metaborate | 5.4 | 4.6 | 85 | 4.9 | 91 |
| +2 wt% Ca tetraborate | 5.4 | 5.0 | 92 | 5.2 | 97 |
| +1 wt% B₂O₃ | 5.4 | 5.1 | 95 | — | — |
| +5 wt% Ca metaborate | 5.2 | 5.2 | 99 | 5.3 | 100 |
| +5 wt% Ca tetraborate | 5.2 | 5.2 | 100 | — | — |
| +5 wt% B₂O₃ | 5.2 | 5.2 | 100 | 5.3 | 100 |
| +10 wt% Ca metaborate | 5.0 | 4.9 | 99 | 4.9 | 99 |
| +10 wt% Ca tetraborate | 5.0 | 5.1 | 100 | 4.9 | 98 |
| +10 wt% B₂O₃ | 5.0 | 4.9 | 99 | — | — |

TABLE III

Fired Densities for Y₂O₃-Stabilized ZrO₂ Compositions

| Composition | Theoretical Density, % | Fired Densities 1200° C. Bulk Density | Fired Densities 1200° C. Theoretical Density, % | Fired Densities 1350° C. Bulk Density | Fired Densities 1350° C. Theoretical Density, % |
|---|---|---|---|---|---|
| Y₂O₃-Stabilized ZrO₂ | 6.1 | 5.4 | 89 | 5.8 | 95 |
| +2 wt% Ca metaborate | 5.9 | 4.7 | 80 | 4.9 | 82 |
| +2 wt% Ca tetraborate | 5.9 | 4.6 | 77 | 5.7 | 97 |
| +2 wt% B₂O₃ | 5.9 | 4.3 | 73 | — | — |
| +1 wt% B₂O₃ | 5.9 | 4.6 | 77 | — | — |
| +5 wt% Ca metaborate | 5.7 | 5.5 | 96 | 5.3 | 93 |
| +5 wt% Ca tetraborate | 5.7 | 5.3 | 93 | 5.6 | 93 |
| +5 wt% B₂O₃ | 5.7 | 4.3 | 76 | — | — |
| +10 wt% Ca metaborate | 5.4 | 5.3 | 99 | 5.3 | 98 |
| °10 wt% Ca tetraborate | 5.4 | 5.4 | 100 | 5.3 | 98 |
| +10 wt% B₂O₃ | 5.4 | 5.2 | 99 | — | — |

Figure 3:
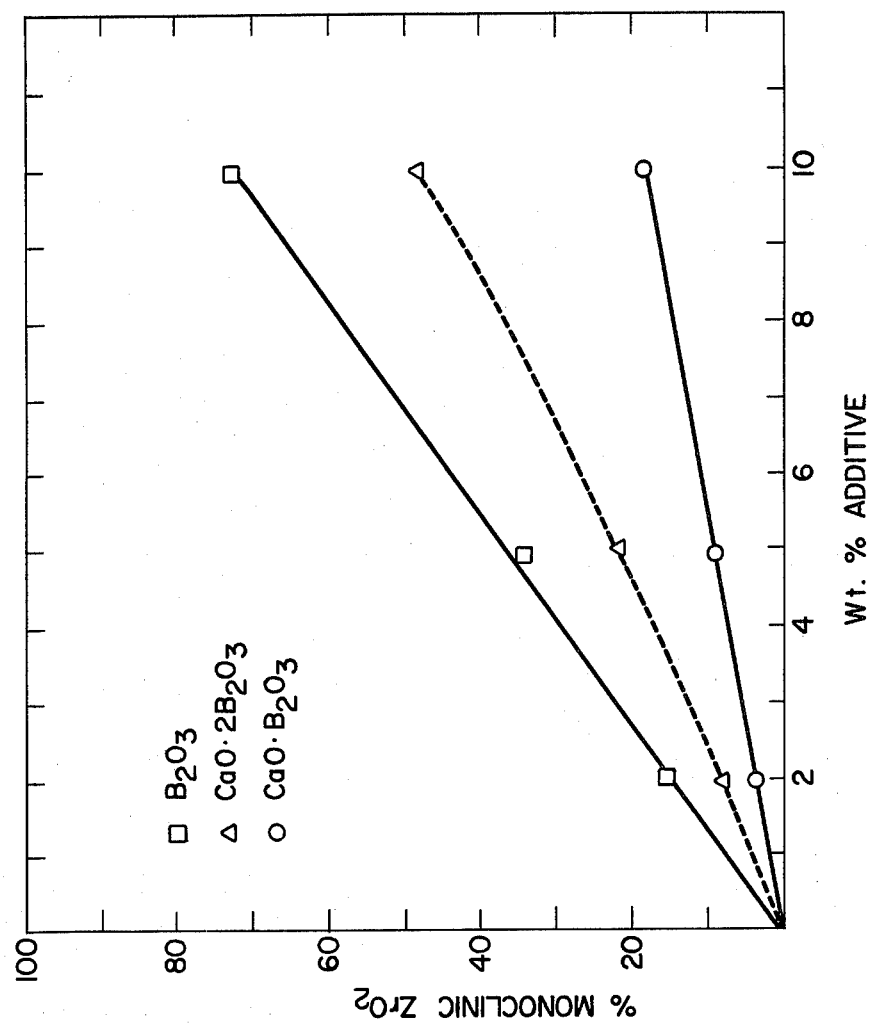
FIG. 3 shows the amount of monoclinic $ZrO_2$ formed from CaO-stabilized, cubic $ZrO_2$ as a function of added boric oxide promoters with firing at 1200° C. for 4 hours.
Figure 4:
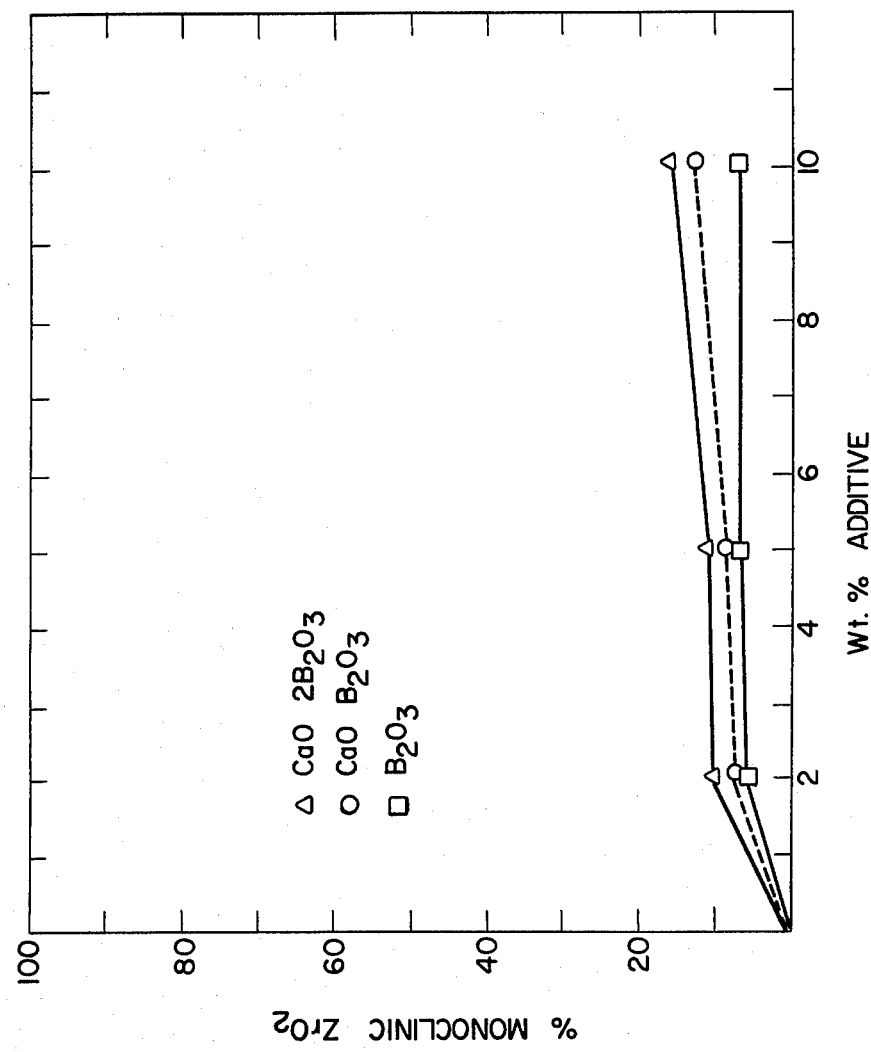
FIG. 4 shows the amount of monoclinic $ZrO_2$ formed from $Y_2O_3$-stabilized, cubic $ZrO_2$ as a function of added boric oxide promoters with firing at 1200° C. for 4 hours.

X-ray diffraction analysis of the CaO-stabilized and Y₂O₃-stabilized ZrO₂ samples fired at 1200° C. with boric oxide promoters showed the presence of both monoclinic and cubic ZrO₂. In FIG. 3 the percent of monoclinic phase present in fired CaO-stabilized samples is plotted against the amount of promoter used. The amount of monoclinic ZrO₂ formed is seen to increase linearly with the amount of promoter used, with B₂O₃ being the most reactive. In FIG. 4 the percent of monoclinic ZrO₂ present in fired Y₂O₃-stabilized samples is plotted against the amount of promoter used. Here it is seen that far less monoclinic phase is formed which is in keeping with the density data that less reaction takes place between the Y₂O₃-stabilized samples and the boric oxide promoters.

It is clear that the herein disclosed invention provides highly effective promoters for densifying zirconia powders at low temperatures. Monoclinic ZrO₂ can be densified with the aid of vanadium oxide promoters at temperatures as low as 1100° C. in a process which avoids the destructive monoclinic/tetragonal phase transformation. Stabilized, cubic ZrO₂ can be successfully densified with the aid of boric oxide promoters at temperatures of about 1200° C., well below those required without added promoter, and with controlled destabilization of cubic to monoclinic ZrO₂.

Although this invention has been described with particular reference to certain preferred embodiments thereof, it is understood that variations and modifications can be effected within the spirit and scope of the appended claim. It is intended that all matter contained in the above description, tables, and figures shall be interpreted in an illustrative and not in a limiting sense.

What is claimed is:

1. A fired ceramic composition having a density greater than about 98% of theoretical density which composition consists essentially of a major amount of zirconia and from about 1.0 to about 15% by weight of a boric oxide densification promoter wherein the boric oxide promoter is selected from the group consisting of calcium metaborate, calcium tetraborate, and B₂O₃; and wherein the zirconia component consists essentially of from about 5 to about 30% by weight of zirconia in the monoclinic crystal configuration, and from about 95 to about 70% by weight of zirconia stabilized in the cubic crystal configuration with from about 5 to about 15% by weight of an oxide selected from the group consisting of CaO, MgO, and Y₂O₃.

2. The composition of claim 1 wherein the boric oxide promoter is selected from the group consisting of calcium metaborate, calcium teraborate, and B₂O₃, said promoter being present in amounts of from about 2 to about 10% by weight; and wherein the zirconia component consists essentially of from about 10 to about 30% by weight of monoclinic zirconia and from about 90 to about 70% by weight of cubic zirconia stabilized with CaO.

3. The composition of claim 1 wherein the boric oxide promoter is selected from the group consisting of calcium metaborate, calcium tetraborate, and B₂O₃, said promoter being present in amounts of about 10% by weight; and wherein the zirconia component consists essentially of from about 10 to about 15% by weight of monoclinic zirconia and from about 90 to about 85% by weight of cubic zirconia stabilized with Y₂O₃.

4. A fired ceramic composition having a density greater than about 90% of theoretical density and being substantially entirely in the monoclinic crystal configuration which composition is prepared by the steps of milling and blending a zirconia powder substantially entirely in the monoclinic crystal configuration with from about 1 to about 10% by weight of a vanadium oxide promoter having a melting point below about 1200° C.; and pressing and firing the milled and blended powder in air at a temperature of from about 1050° to about 1125° C. for from about 0.5 to about 24 hours.

5. The composition of claim 4 wherein the vanadium oxide promoter is selected from the group consisting of $ZrV_2O_7$ and $V_2O_5$ in amounts of from about 2 to about 6% by weight, and the firing temperature is from about 1075° to about 1100° C. for from about 4 to about 24 hours.

6. The composition of claim 1 having a density of greater than about 98% of theoretical density prepared by the steps comprising milling and blending a zirconia powder, stabilized in the cubic crystal configuration with from about 5 to about 15% by weight of an oxide selected from the group consisting of CaO, MgO, $Y_2O_3$, with from about 1 to about 15% by weight of a boric oxide promoter having a melting point below about 1200° C.; and pressing and firing the milled and blended powder in air at a temperature of from about 1150° to about 1350° C. for from about 0.5 to about 4 hours to effect said densification and to convert from about 5 to about 30% by weight of the cubic zirconia to monoclinic zirconia.

7. The composition of claim 6 wherein the boric oxide promoter is selected from the group consisting of calcium metaborate, calcium tetraborate, and $B_2O_3$ in amounts of from about 2 to about 10% by weight, and the firing temperature is from about 1200° to about 1350° C. for from about 0.5 to about 4 hours.

8. A process for preparing a zirconia ceramic composition having a density greater than about 90% of theoretical density and being substantially entirely in the monoclinic crystal configuration comprising the steps of milling and blending a zirconia powder substantially entirely in the monoclinic crystal configuration with about from 1 to about 10% by weight of a vanadium oxide promoter having a melting point below about 1200° C.; and pressing and firing the milled and blended powder in air at a temperature of from about 1050° to about 1125° C. for from about 0.5 to about 24 hours.

9. The process of claim 8 wherein the vanadium oxide promoter is selected from the group consisting of $ZrV_2O_7$ and $V_2O_5$ in amounts of from about 2 to about 6% by weight; and the firing temperature is from about 1075° to about 1100° C. for from about 4 to about 24 hours.

10. A process for preparing a zirconia ceramic composition having a density greater than about 98% of theoretical density comprising the steps of milling and blending a zirconia powder, stabilized in the cubic crystal configuration with from about 5 to about 15% by weight of an oxide selected from the group consisting of CaO, MgO, and $Y_2O_3$, with from about 1 to about 15% by weight of a boric oxide promoter having a melting point below about 1200° C.; and pressing and firing the milled and blended powder in air at a temperature of from about 1150° to about 1350° C. for from about 0.5 to about 4 hours to effect said densification and to convert from about 5 to about 30% by weight of the cubic zirconia to monoclinic zirconia.

11. The process of claim 10 wherein the boric oxide promoter is selected from the group consisting of calcium metaborate, calcium tetraborate, and $B_2O_3$ in amounts of from about 2 to about 10% by weight, and the firing temperature is from about 1200° to about 1350° C. for from about 0.5 to about 4 hours.

* * * * *